(12) United States Patent
Foggi et al.

(10) Patent No.: US 8,995,519 B2
(45) Date of Patent: Mar. 31, 2015

(54) ADAPTIVE EQUALISER WITH ASYNCHRONOUS DETECTION AND INHIBIT SIGNAL GENERATOR

(75) Inventors: Tommaso Foggi, Parma (IT); Giulio Colavolpe, Parma (IT)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 103 days.

(21) Appl. No.: 13/876,821

(22) PCT Filed: Oct. 15, 2010

(86) PCT No.: PCT/EP2010/065558
§ 371 (c)(1),
(2), (4) Date: Oct. 1, 2013

(87) PCT Pub. No.: WO2012/041399
PCT Pub. Date: Apr. 5, 2012

(65) Prior Publication Data
US 2014/0023133 A1    Jan. 23, 2014

(30) Foreign Application Priority Data
Sep. 28, 2010 (EP) .................................... 10180946

(51) Int. Cl.
*H03H 7/30* (2006.01)
*H04L 27/01* (2006.01)
*H04L 25/03* (2006.01)

(52) U.S. Cl.
CPC ............ *H04L 27/01* (2013.01); *H04L 25/0305* (2013.01); *H04L 2025/03694* (2013.01)
USPC ........... 375/232; 375/226; 375/229; 375/230; 375/316; 375/346; 327/551; 455/296

(58) Field of Classification Search
CPC ................ H04L 27/01; H04L 25/0305; H04L 2025/03694
USPC ......... 375/226, 229, 232, 262, 316, 340, 341, 375/346, 350, 371, 373, 375, 230; 327/551; 455/296
See application file for complete search history.

(56) References Cited

PUBLICATIONS

Erik Agrell et al., "Power-Efficient Modulation Formats in Coherent Transmission Systems", Journal of Lightwave Technology, vol. 27, No. 22, Nov. 15, 2009, 12 pages, IEEE.
(Continued)

*Primary Examiner* — Leon Flores
(74) *Attorney, Agent, or Firm* — Blakely Sokoloff Taylor & Zafman LLP

(57) ABSTRACT

Generating updated coefficients for an adaptive equalizer involves generating phase tracking information using asynchronous detection strategy (ADS) based on resolved data, and equalized signals, and estimating a phase corrected error based on the equalized signals, the phase tracking information and the resolved data. An inhibit signal is generated to inhibit updating of the equalization coefficients, the inhibit signal representing a likelihood of the phase corrected error being accurate, determined according to the phase corrected error, and the equalized signals. The equalization coefficients for the equalizer are adapted based on the received signals, and on the phase corrected error, and the adapting is inhibited according to the inhibit signal. Compared to conventional ADS, the new combination with the inhibit signal can enable improved convergence of coefficient adaptation. This is particularly useful for coherent receivers for optical systems.

17 Claims, 11 Drawing Sheets

(56) References Cited

PUBLICATIONS

Alan Barbieri et al., "OFDM versus Single-Carrier Transmission for 100 Gbps Optical Communication", Journal of Lightwave Technology, vol. 28, No. 17, Sep. 1, 2010, 15 pages, IEEE.

Albert Benveniste et al., "Blind Equalizers", IEEE Transactions on Communications, vol. COM-32, No. 8, Aug. 1984, 13 pages, IEEE.

G. Charlet et al., "72x100Gb/s transmission over transoceanic distance, using large effective area fiber, hybrid Raman-Erbium amplification and coherent detection", 2009 OSA/OFC/NFOEC 2009, 3 pages.

Giulio Colavolpe et al., "Robust Multilevel Coherent Optical Systems With Linear Processing at the Receiver", Journal of Lightwave Technology, vol. 27, No. 13, Jul. 1, 2009, 13 pages, IEEE.

Irshaad Fatadin et al., "Blind Equalization and Carrier Phase Recovery in a 16-QAM Optical Coherent System", Journal of Lightwave Technology, vol. 27, No. 15, Aug. 1, 2009, 8 pages, IEEE.

Dominique N. Godard, "Self-Recovering Equalization and Carrier Tracking in Two-Dimensional Data Communication Systems", IEEE Transactions on Communications, vol. COM-28, No. 11, Nov. 1980, 9 pages, IEEE.

Ezra M. IP et al., "Fiber Impairment Compensation Using Coherent Detection and Digital Signal Processing", Journal of Lightwave Technology, 2010, 18 pages, IEEE.

Xiang Liu et al., "Improving the Nonlinear Tolerance of Polarization-Division-Multiplexed CO-OFDM in Long-Haul Fiber Transmission", Journal of Lightwave Technology, vol. 27, No. 16, Aug. 15, 2009, 9 pages, IEEE.

Masataka Nakazawa et al., "256 QAM (64 Gbit/s) Coherent Optical Transmission over 160 km with an Optical Bandwidth of 5.4 GHz", OSA / OFC/NFOEC 2010, 3 pages, IEEE.

Giorgio Picchi et al., "Blind Equalization and Carrier Recovery Using a "Stop-and-Go" Decision-Directed Algorithm", IEEE Transactions on Communications, vol. COM-35, No. 9, Sep. 1987, 11 pages, IEEE.

Greg Raybon et al., "100 Gb/s Challenges and Solutions", Alcatel-Lucent, OFC/NFOEC 2008, 35 pages, IEEE.

Yoichi Sato, "A Method of Self-Recovering Equalization for Multilevel Amplitude-Modulation Systems", IEEE Transactions on Communications, Jun. 1975, 4 pages.

William J. Weber III, "Differential Encoding for Multiple Amplitude and Phase Shift Keying Systems", IEEE Transactions on Communications, vol. COM-26, No. 3, Mar. 1978, 7 pages, IEEE.

Peter J. Winzer et al., "100-Gb/s DQPSK Transmission: From Laboratory Experiments to Field Trials", Journal of Lightwave Technology, vol. 26, No. 20, Oct. 15, 2008, 15 pages, IEEE.

P. J. Winzer et al., "Spectrally Efficient Long-Haul Optical Networking Using 112-Gb/s Polarization-Multiplexed 16-QAM", Journal of Lightwave Technology, vol. 28, No. 4, Feb. 15, 2010, 10 pages, IEEE.

Jian Yang, et al., "The Multimodulus Blind Equalization and Its Generalized Algorithms", IEEE Journal on Selected Areas in Communications, vol. 20, No. 5, Jun. 2002, 19 pages, IEEE.

International Search Report, Application No. PCT/EP2010/065558, dated Jun. 28, 2011, 2 pages.

Colavolpe et al., "Noncoherent Sequence Detection", IEEE Transactions on Communications, vol. 47, No. 9, Sep. 1999, pp. 1376-1385.

ADAPTIVE EQUALISER WITH ASYNCHRONOUS DETECTION AND INHIBIT SIGNAL GENERATOR

CROSS-REFERENCE TO RELATED APPLICATIONS

This application is a National stage of International Application No. PCT/EP2010/065558, filed Oct. 15, 2010, which claims priority to EP Application No. 10180946.5, filed Sep. 28, 2010, which are hereby incorporated by reference.

TECHNICAL FIELD

This invention relates to adaptive equalizers, to receivers having such adaptive equalizers, to methods of generating updated coefficients for an adaptive equaliser, and to corresponding programs for carrying out such methods.

BACKGROUND

Adaptive equalizers are known for compensating for impairments which are unpredictable or time-varying. Such equalisers are adapted by generating coefficients based on the current conditions, typically from the inputs and/or outputs of the equalizer. The coefficients are then used typically by carrying out a convolution with the equalizer inputs. Many algorithms are known for generating suitable coefficients, and adapting them to converge iteratively towards an optimum compensation. In some cases known training inputs can be used, in other cases it is more practical if the algorithm can converge without needing known inputs, known as blind equalization. Such equalization can be used in a receiver for compensating for impairments introduced in a transmission channel, or for other applications such as filtering of signals from a sensor.

In a receiver, to enable higher transmission capacity over an optical fiber, coherent detection has recently enabled high-order modulation formats in single-carrier (SC) optical systems where a simple feed-forward equalizer (FFE), in proper configuration, is able to compensate for fiber linear impairments, such as group velocity dispersion (GVD) and polarization mode dispersion (PMD). This has been shown by G. Colavolpe, T. Foggi, E. Forestieri, and G. Prati, "Robust multilevel coherent optical systems with linear processing at the receiver," J. Lightwave Tech., vol. 27, pp. 2357-2369, Jul. 1, 2009, (hereinafter Colavolpe et al) using asynchronous detection in the form of a non coherent sequence detection to track phase changes in the channel.

The convergence of the iterative generation of coefficients for equalization of systems using QAM signals in polarization multiplexed coherent optical systems is not as straightforward as it is with QPSK modulation formats. There exist several different solutions, from the simple constant modulus algorithm (CMA) to more complicated versions of the CMA itself, like the radius directed equalizer (RDE), which trade between effectiveness and complexity. However, such blind algorithms may drive the convergence to local minima of the error function, so that the best performance of the linear equalizer cannot be reached. Thus, with existing algorithms a fast and reliable convergence is not guaranteed.

SUMMARY

An object of the invention is to provide improved apparatus or methods. According to a first aspect, the invention provides:

An adaptive equaliser for equalising a received signal, the adaptive equaliser having: an equaliser coupled to equalise the received signals according to equalisation coefficients, to provide an equalised signal having a representation of amplitude and phase of the received signals, and a detector for resolving data from the equalised signal. For adapting the coefficients, there is provided an asynchronous detection strategy (ADS) part for generating phase tracking information based on the resolved data and the equalised signals, an error estimator for estimating a phase corrected error based on the equalised signals, the phase tracking information and the data, and an inhibit signal generator for generating an inhibit signal to inhibit updating of the equalisation coefficients, the inhibit signal representing a likelihood of the phase corrected error being accurate, determined according to the phase corrected error, and according to the equalised signals. A coefficient generator is provided for adapting the equalisation coefficients for the equaliser based on the received signals, and based on the phase corrected error, and arranged to inhibit the adapting according to the inhibit signal.

Compared to using ADS in a conventional way, the new combination of ADS and the inhibit signal can enable improved convergence of the coefficients towards a minimum error.

Another aspect of the invention can involve a receiver having such an adaptive equalizer.

Another aspect of the invention can involve a corresponding method of adapting coefficients, the adaptive equaliser having an equaliser for outputting equalised signals and a detector for resolving data from the equalised signals, the method having the steps of generating phase tracking information using an asynchronous detection strategy based on the resolved data, and the equalised signals, and estimating a phase corrected error based on the equalised signals, the phase tracking information and the resolved data. The method also involves generating an inhibit signal to inhibit updating of the equalisation coefficients, the inhibit signal representing a likelihood of the phase corrected error being accurate, determined according to the phase corrected error, and according to the equalised signals, and adapting the equalisation coefficients for the equaliser based on the received signals, and based on the phase corrected error, and inhibiting the adapting according to the inhibit signal.

Another aspect of the invention can involve a corresponding program for carrying out such methods. Any additional features can be added to these aspects, or disclaimed from them, and some are described in more detail below. Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

Figure 1:
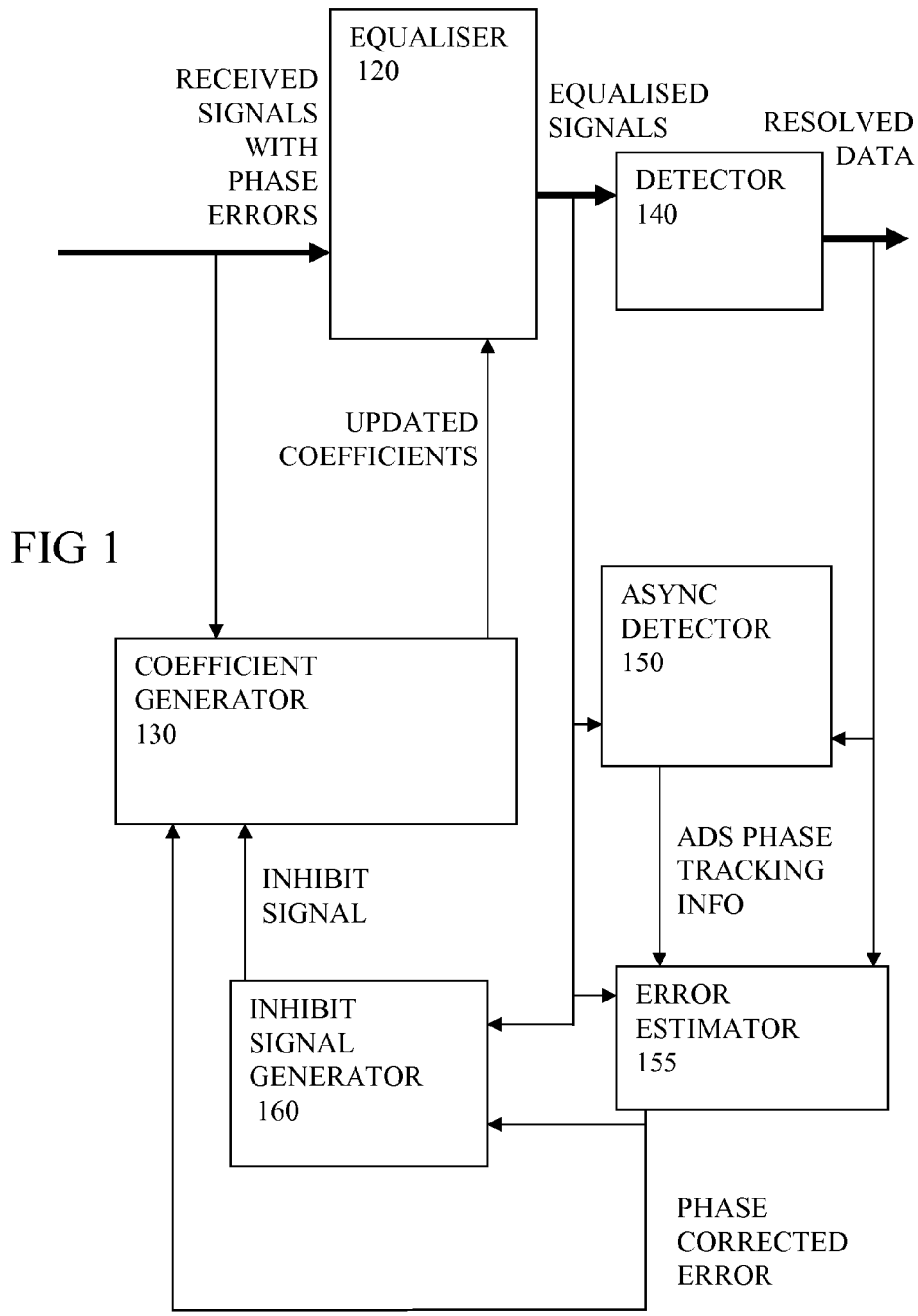
FIG. 1 shows a schematic view of an adaptive equalizer according to an embodiment of the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

DEFINITIONS

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps.

Elements or parts of the described adaptive equalisers or receivers may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to receivers can encompass any kind of receiver, not limited to the types described, not limited to any level of integration, or size or bandwidth or bit rate and so on.

References to computer programs or software can encompass any type of programs in any language executable directly or indirectly on processing hardware.

References to hardware, processing hardware or circuitry can encompass any kind of logic or analog circuitry, integrated to any degree, and not limited to general purpose processors, digital signal processors, ASICs, FPGAs, discrete components or logic and so on.

In optical systems, the term "coherent" refers to the coherence of the optical carrier, not to be confused with coherence in wireless systems which implies knowledge of the phase of the received signal.

Herein the terms "synchronous" and "asynchronous" refer to processing which assumes or not the knowledge of the channel phase.

References to asynchronous detection or an asynchronous detection strategy are intended to encompass any asynchronous method of detecting phase information which avoids estimation of the actual phase of the received or equalized signal, by determining a product of the resolved data and the equalized signal so as to represent the evolution of recent phase errors.

References to phase tracking information are intended to encompass any information about unwanted phase changes introduced by the channel, such as laser noise, filter noise, amplifier noise and so on.

References to equalization coefficients are intended to encompass at least a set of values applied to all the taps of an equalizer, where the values can be real or complex values and can encompass values for multiple channels.

ABBREVIATIONS

ASE Amplified Spontaneous Emission
a-SG asynchronous Stop-and-Go
AD Analog-to-Digital
CMA Constant Modulus Algorithm
FFE Feed-Forward Equalizer
GVD Group Velocity Dispersion
LMS Least-Mean-Square
O/E Opto-Electronic
OFDM Orthogonal Frequency Division Multiplexing
PBS Polarization Beam Splitter
PD Photo diode
PMD Polarization Mode Dispersion
PN Phase Noise
QAM Qaudrature Amplitude Modulation
QPSK Quadrature Phase Shift Keying
RDE Radius Directed Equalizer
SCM Sub-Carrier Multiplexing
SMF Single Mode Fiber
SOP State-Of-Polarization
SG Stop-and-Go
Introduction By way of introduction to the embodiments, some issues with conventional designs will be explained. The recent and renewed diffusion of coherent detection in optical communications is pushed, besides other factors, by the need to increase the spectral efficiency, which can be reached through the exploitation of high-order modulation formats. Single-carrier polarization-multiplexed quadrature phase shift keying (QPSK) is currently a favoured format for the upcoming 100-Gb/s systems. Research is now addressing the 400 Gb/s or even 1 Tb/s systems, with a large variety of proposed solutions from orthogonal frequency division multiplexing (OFDM), to subcarrier multiplexing (SCM), from novel modulation formats, to classical high-order modulations, like multilevel quadrature amplitude modulations (QAM). Predictably, the first efforts were directed to the feasibility analysis of the well-known QAM formats, which require a proper modulator, are more sensitive to phase noise and frequency offset, and, obviously, are less energy-efficient than simple QPSK schemes. For any of these schemes, equalisation is needed and the convergence of blind strategies for the update of the equalizer taps needs to be assured, in case training inputs are hard or impractical to provide.

FIG. 1, an Adaptive Equalizer According to a First Embodiment

To address this issue, some embodiments of the present invention involve tap coefficient update of a two-dimensional linear equalizer combining an inhibit feature of the "Stop-and-Go" (SG) method, which enables the update of the coefficients only under certain conditions of the received signal, with features of a known asynchronous detection strategy method. The asynchronous detection exploits past received signal samples and decided symbols. The combination with the inhibition of update can improve convergence properties in case of phase noise and linear impairments. This is particularly (but not only) applicable to optical systems as fiber-optics main impairments are phase noise and linear impairments. It is particularly (but not only) applicable to receivers using coherent detection as this provides phase information and is susceptible to phase noise.

FIG. 1 shows a schematic view of some of the principal features of an adaptive equaliser according to a first embodiment. Various ways of implementing each of the features can be envisaged, and other features may be added. An equaliser 120 and a detector 140 are shown. Received signals are input to the equaliser. Equalised signals from the equaliser are fed to the detector 140, which produces resolved data. An asynchronous detection part 150 uses the equalised signals and the resolved data to produce ADS phase tracking information. An error estimator 155 uses the resolved data and the equalised signals and the ADS phase tracking information to produce a phase corrected error. An inhibit signal generator 160 uses the phase corrected error and the equalised signals to produce an inhibit signal for inhibiting updating of the coefficients. A coefficient generator 130 generates updated coefficients based on the received signals, the phase corrected error and the inhibit signal.

In the particular example of polarization-multiplexed coherent optical systems, it is known that linear equalization is able to compensate for group velocity dispersion (GVD) and polarization mode dispersion (PMD). If the convergence of the decision-directed least-mean-square (LMS) algorithm in blind mode (i.e., without training symbols) is less of a concern with QPSK, it is not the same with QAM formats. In the literature, there exist several blind equalization algorithms for QAM. Some embodiments of the invention described below can implement the inhibit feature based on a known stop go algorithm [see G. Picchi and G. Prati, "Blind equalization and carrier recovery using a 'stop-and-go' decision directed algorithm," IEEE Trans. Commun., vol. 35, pp. 877-887, September 1987.]. This can work jointly with the asynchronous detection strategy known from Colavolpe et al, which was demonstrated to be a simple and effective technique to compensate for transmit and receive lasers' phase noise (PN). Compared to using stop/go without ADS, the effects of phase noise can be corrected more efficiently by the new combination and hence convergence towards a minimum error can be improved. This is particularly so for systems having notable phase noise.

In one example, a receiver using blind update of the equalizer coefficients or taps for use with signals having a 16-ary quadrature amplitude modulation (QAM) format in the presence of different channel impairments is described in some detail.

Some Additional Features

One additional feature for the adaptive equaliser is the asynchronous detection part (150) having a multiplier (220) for generating a product of the resolved data and the equalised signals, and an (230) adder for summing N products taken at different time instants. This is a relatively efficient way of tracking the phase with more robustness than other ways.

Another such feature is the detector (140) being arranged to resolve the data using the phase tracking information generated by the non coherent detection part. This optional addition can help provide the detector with more robustness to phase noise, with no performance degradation when there is no such noise, over a comparable synchronous detection technique.

The detector (140) can comprise a decoder (200) for differentially decoding detected data assuming that differential encoding was applied before the transmission, the resolved data comprising the decoded data. This can mean the decoding is incorporated in the feedback loop for the equalisation which can be more efficient, and more robust against phase noise. Alternatively the undecoded data can be used as the resolved data in the feedback.

The coefficient generator (130) can have a multiplier to determine a product of the phase corrected error signal and the received signals, and be arranged to determine iteratively a next set of coefficients according to a difference between the product and the previous set of coefficients. This is a particularly efficient way of determining the coefficients, though other additions or alternatives can be envisaged.

The coefficient generator can be arranged to generate updated coefficients for equalisation of real and imaginary components, the inhibit signal having separate components for the real component coefficients and the imaginary component coefficients. The coefficient generator can also be arranged to inhibit update of either or both of the real component coefficients and imaginary component coefficients according to the separate components of the inhibit signal. This can help achieve improved convergence of the adaptation since less unnecessary inhibiting of updating takes place.

The error estimator (155) can have a multiplier to determine a product of the phase tracking information and the data, and a subtractor to determine a difference between the equalised signals and the product, the phase corrected error being based on the difference. This is a particularly efficient way of generating the phase corrected error, though other ways can be envisaged.

The inhibit signal generator (160) can have a subtractor to determine an error threshold by determining a distance between the equalised signal and a predetermined radius error, the radius error having the same sign as that of the equalised signal. The inhibit signal generator can also have a comparator to determine if the error threshold has the same sign as a sign of the phase corrected error, and to generate the inhibit signal according to the output of the comparator. This is a particularly effective way of generating the inhibit signal, though other features can be added or substituted. It can be determined relatively simply, and yet corresponds closely to whether the update will improve the convergence in practice.

The equaliser (120) can be a feed forward equaliser for equalising received signals having complex-valued outputs by determining products of successive complex-valued received signals and complex-valued equalizer coefficients, and summing the products to output a equalised signals. The equaliser (120) can be designed to process two input received signals with four equaliser components in 2×2 matrix configuration, to output two equalized signals, in case of polarization multiplexing. This is a common type of equaliser, though others can be envisaged.

The adaptive equaliser can be part of a receiver (300) having an optical front end for receiving an optical signal and outputting a received signal in electrical form. This adaptive equalisation is particularly suited to optical systems as it can compensate for phase noise and other impairments which are significant in such optical systems.

The optical front end can have a polarization splitter for separating optical signals transmitted with different optical polarizations, and converters for converting the separated optical signals into separate electrical signals having real and imaginary components, the equaliser being arranged to provide equalised real and imaginary components of each of the separated signals. This adaptive equalisation is particularly well suited to such systems as the equaliser can help demultiplex the signals transmitted with different polarizations.

Coherent Receiver Example

Coherent receivers for next generation optical communication systems involve the problem of carrier synchronization. Homodyne detection allows for a simple and effective postdetection processing, but the demand for a stable and accurate local oscillator locked to the optical carrier still entails problems. On the other hand, if heterodyne schemes do not need an optical phase-locked loop (PLL), the necessary two frequency conversion steps result more expensive. For these reasons, the so called intradyne schemes are a possibility. In intradyne receivers, the frequency offset between the optical carrier and the free-running local oscillator can be a notable fraction of the symbol rate, thus preventing the receiver from working properly, after the optoelectronic conversion an AFC can be included in the processing unit to keep such offset within an acceptable range. The core of the electronic receiver processing is then constituted by the above-mentioned 2-D matched filter, which is able to perfectly compensate for GVD and PMD. It can be implemented in the form of an adaptive 2-D fractionally spaced feedforward equalizer (FFE). By adopting the minimum mean square error (MMSE) criterion for the adaptation of its coefficients, the FFE converges to the 2-D matched filter. Any ambiguities occurring when the adjustment of the FFE coefficients is performed in a decision-directed fashion can be addressed by a 2-D differential encoding rule as described in Colavolpe et al. One major problem of coherent optical systems, namely, the receiver sensitivity to the phase noise introduced by the transmit and receive lasers is addressed by using an asynchronous detection strategy and an asynchronous ADS based filter adjustment algorithm for the FFE taps, described in more detail below.

Example System Description

In the following bold and capital-bold denote vectors and matrices, respectively, $(\cdot)^T$ denotes transpose, $(\cdot)^*$ complex conjugate, and $(\cdot)^H$ transpose conjugate.

As is described in Colavolpe et al, in this example system, polarization multiplexing is employed. To this end, two independent sequences $\{a_{i,k}, k=1, 2, \ldots, K-1\}$, where $i=1, 2$, of K-1 complex symbols belonging to an M-ary complex alphabet undergo separate differential encoding, thus generating two sequences $\{d_{i,k}, k=0, 1, \ldots, K-1\}$ where $i=1, 2$, of K of complex symbols each, belonging to the same alphabet. For conciseness, we will use the notation $$a_k = [a_{1,k}, a_{2,k}]^T \quad (1)$$

$$d_k = [d_{1,k}, d_{2,k}]^T \quad (2)$$

Without loss of generality, these examples described use classical phase-shift keying (PSK) signals, for which the standard differential encoding rule is employed, and square quadrature amplitude modulations (QAMs) for which known quadrant differential encoding is adopted. However, similar derivations can also be applied to other alphabets, e.g., amplitude- and phase-shift keying (APSK) modulations, whose signal constellations are composed of more concentric rings of PSK points.

These two symbol streams are launched, after linear modulation, on two orthogonal states of polarization (SOPs) of an SMF. The low-pass equivalent of the transmitted signal components can be expressed as $$[s_1(t), s_2(t)]^T = \sum_l d_l p(t-lT) = \sum_l P(t-lT)d_l \quad (2)$$

Where T is the symbol interval, p(t) is the transmitted pulse, and P(t)=p(t)I, having denoted by I the 2×2 identity matrix. Without loss of generality, it is assumed that $p(t) \otimes p^*(-t)|_{t=kT} = \delta_k$, where $\delta_k$ is the Kronecker delta and $\otimes$ denotes "convolution," and it is assumed that the transmitted pulse, after its corresponding matched filter, satisfies the condition for the absence of intersymbol interference (ISI). This ensures that in the back-to-back (b2b) case the optimal detector is the symbol-by-symbol one. Hence, $$P^H(-t) \otimes P(t)|_{t=kT} = \delta_k I \quad (3)$$

H(t) denotes a 2×2 Jones matrix representing the 2-D impulse response of the SMF, accounting for both GVD and PMD and a possible constant unknown phase shift due to the phase uncertainty of the transmit and receive lasers. Its entrywise Fourier transform is a unitary matrix irrespective of the amount of GVD and the amount or model (1st, 2nd, or higher) of PMD. Hence $$H(t) \otimes H^H(-t) = H^H(-t) \otimes H(t) = \delta(t)I \quad (4)$$

having denoted by $\delta(t)$ the Dirac delta function.

The transmitted signal also experiences optical amplification before the receiver end. The low-pass equivalent of the amplified spontaneous emission (ASE) noise can be modeled as a couple of independent complex noise components, each with two-sided power spectral density (PSD) equal to $N_0$, taking into account the noise components on two orthogonal SOPs. The receiver can be seen as composed of an analog part, the optoelectronic (O/E) front end, devoted to signal demodulation and conversion from the optical to the electrical domain, and a digital part devoted to electronic processing. After a preliminary optical filtering, two orthogonal SOPs are split through a polarization beam slitter (PBS). They are then separately combined with the optical field of a local oscillator laser (LO) in a 2×4 90 degree hybrid and detected with two balanced photodetectors. In this way, the two received signals, one for each SOP, are converted in the electrical domain, in practice performing a frequency conversion. The frequency offset between the incoming signal and the LO laser is assumed to be at most equal to the symbol rate. This enables at the receiver, a free-running LO laser to be used without the additional expense or complication of a complex optical PLL, thus delegating to the electronic processing part the task of a fine frequency recovery. In other words, an intradyne scheme is implemented. Hence, the received signal can be expressed as $$r(t) = [r_1(t), r_2(t)]^T = \sum_l Q(t-lT)d_l e^{j2\pi Ft} + w(t) \quad (5)$$

Where $F \le 1/T$ is the above mentioned frequency offset between the incoming signal and the local oscillator, Q(t) is a 2×2 matrix given by $Q(t)=H(t) \otimes P(t)$, and $w(t)=[w_1(t), w_2(t)]^T$ collects the noise signal components on the above-mentioned orthogonal SOPs. ASE noise is assumed to be dominant over thermal and shot noise.

Without loss of generality, the further processing is fully digital, although an equivalent analog processing can be devised. To this purpose, a possible way of extracting sufficient statistics from the received signal r(t) is by means of sampling at the Nyquist rate. In the following, it is assumed that η samples per symbol interval are extracted from the signal, that is the sampling interval is $T_c=T/\eta$. This number of samples depends on the bandwidth of the received useful signal and the value of F. The optical filter and the electrical filters are assumed to have no effect on the useful signal so that the noise samples are independent and identically distributed complex Gaussian random variables with mean zero and variance $\sigma^2=N_0\eta/T$. The samples of r(t) at discrete-time instants $lT_c=kT+nT_c=(k\eta+n)T_c$, k=0, 1, . . . , K−1, n=, 0, 1, . . . η−1 will be denoted as $r_l=r(lT_c)=[r_{1,l},r_{2,l}]^T$.

The fine frequency recovery is then performed by means of an electrical AFC loop, which performs closed-loop frequency estimation and compensation assuming that neither data nor clock information is available. The samples at its output will be denoted as $x_l=[x_{1,l},x_{2,l}]^T$.

Signal Processing

The signal samples are then processed by an adaptive two-dimensional feed-forward equalizer (FFE). In this section only, a simplified notation is used to facilitate understanding of features of embodiments. It is simplified by using a common index k which may represent a sample time or a fraction of a sample time according to the system model explained above. Received signals denoted by $$x_k=[x_{1,k},x_{2,k}]^T$$

can be in the form of a column vector collecting the two-dimensional complex signal samples at time instant $kT_c$, one for each SOP. Equalised signals denoted by $$y_k=[y_{1,k},y_{2,k}]^T,$$

are in the form of output samples representing samples taken at time instant kT (ignoring for convenience that the sample rate of y may be different to that of x), which are fed to a detector, for example the asynchronous symbol-by-symbol detection algorithm described in Colavolpe et al.

As mentioned above, amplitude/phase modulation formats like 16-QAM in particular can entail uncertain convergence of the algorithms for the adaptation of the equalizer coefficients. Thus, a modified Stop-and-Go algorithm is proposed, since the presence of the asynchronous detection strategy in Colavolpe et al, used for both detection and equalizer tap update, is exploited. This new combination will be called asynchronous Stop-and-Go (a-SG) and the corresponding phase corrected error signal reads $$\hat{e}_k=(y_k-g_k\odot\hat{d}_k) \quad (6)$$

where $$\hat{e}_k=[\hat{e}_{1,k},\hat{e}_{2,k}]^T \quad (7)$$

$\odot$ denotes the Hadamard product and $$g_k=[g_{1,k},g_{2,k}]^T \quad (8)$$

which is a vector, which can have components for each of the polarizations as follows:

$$g_{i,k} = \frac{\sum_{n=1}^{N_p} y_{i,k-n}\hat{d}^*_{i,k-n}}{\left|\sum_{n=1}^{N_p} y_{i,k-n}\hat{d}^*_{i,k-n}\right|} \quad (9)$$

This is an example of how the phase tracking information (ADS term) can be determined.

Figure 2:
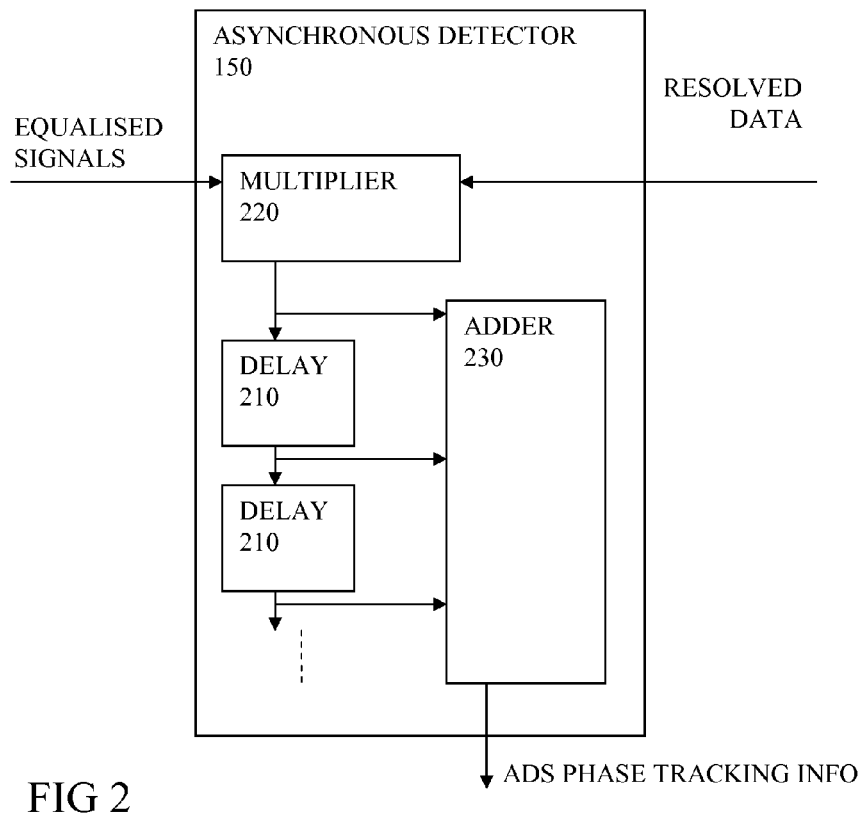
FIG. 2 shows a schematic view of an example of an asynchronous detector for use in an embodiment.

FIG. 2, Asynchronous Detection Strategy ADS

FIG. 2 shows a schematic view of an example of an asynchronous detector 150 corresponding to this equation. A multiplier 220 provides a product of corresponding samples of the equalized signals y and resolved data d. The product is fed to a series of delay elements 210 which are provided to enable a sequence of N of the products covering a given time period to be added by adder 230. This part outputs the ADS phase tracking information as a stream of complex values g.

A more detailed analysis of an example implementation of the ADS is set out in "Noncoherent Sequence Detection" by Colavolpe and Raheli, IEEE transactions on Communications, Vol 47 No 9, September 1999, particularly section V on Examples of Applications, page 1381. This shows an application to differentially encoded QAM with the description of the computation of ADS term. Other ways of implementing this are also known, some are referenced in Colavolpe et al.

Figure 3:
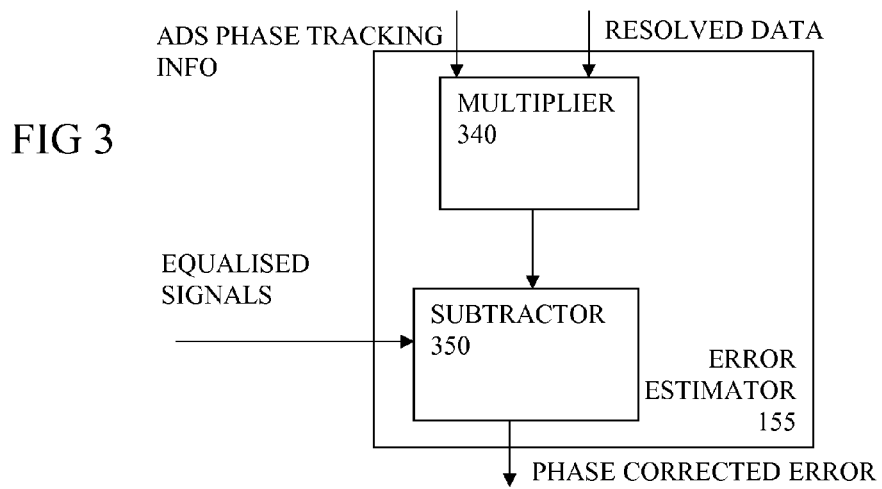
FIG. 3 shows a schematic view of an example of an error estimator for use in an embodiment.

FIG. 3, Error Estimator

FIG. 3 shows a schematic view of an example of an error estimator corresponding to the equation $\hat{e}_k=(y_k-g_k\odot\hat{d}_k)$. A multiplier 340 is provided for determining a product of the ADS phase tracking information g, and the resolved data d. The product is fed to a subtractor 350 which subtracts the product from the equalised signal y to output the phase corrected error e again as a stream of complex values.

Figure 4:
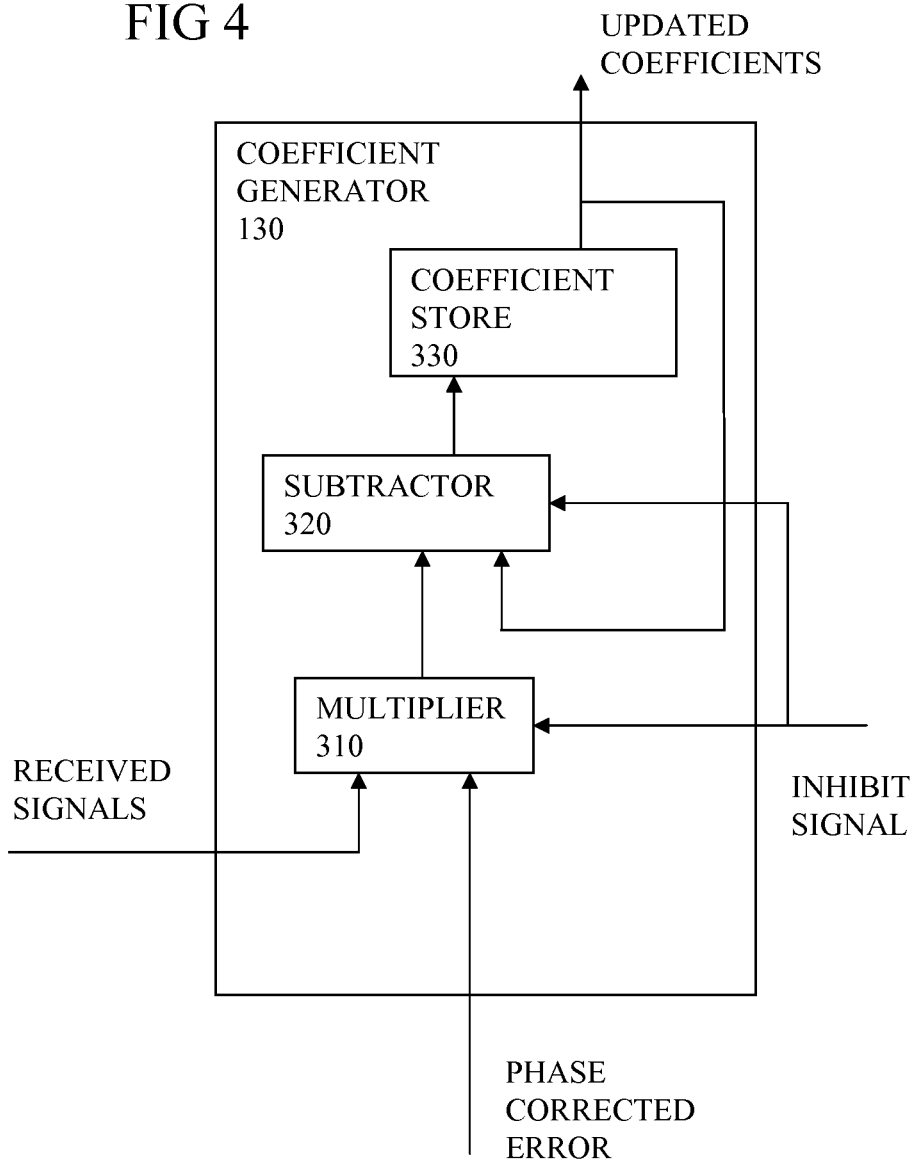
FIG. 4 shows a schematic view of an example of a coefficient generator.
Figure 5:
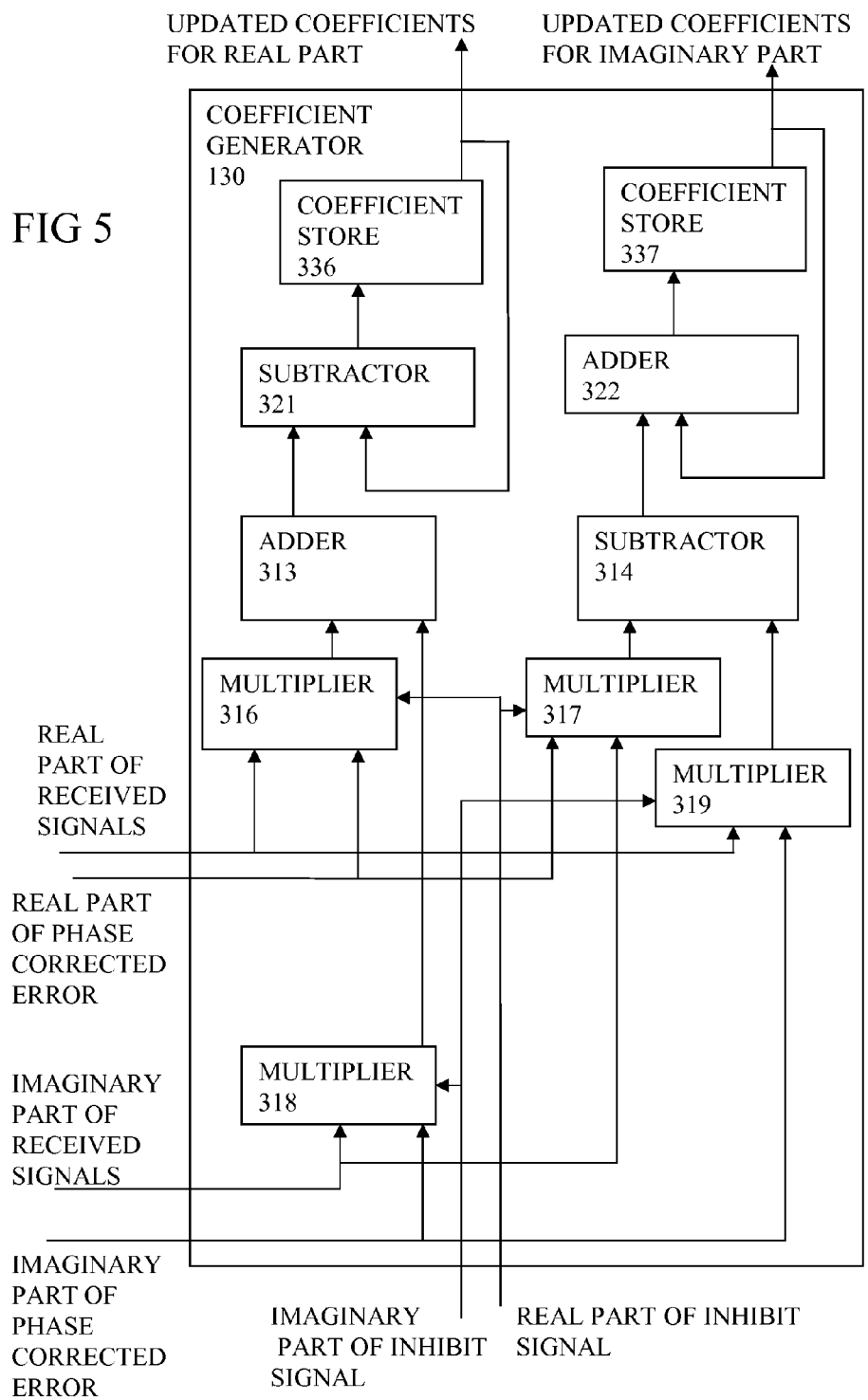
FIG. 5 shows a schematic view of another example of a coefficient generator.

FIGS. 4, 5, Coefficient Generator

FIG. 4 shows a schematic view of an example of a coefficient generator 130. A coefficient adaptation value is generated by a multiplier 310 which obtains a product of the received signals x and the phase corrected error e. This adaptation value is subtracted by subtractor 320 from a previous value of the coefficients, and stored in coefficient store 330. An inhibit signal can be used to influence the updating to reduce the effect of the update if the phase corrected error is determined not to be sufficiently accurate. This inhibit signal can be used in a number of different ways, for example to stop the multiplier, or to reduce the output of the multiplier by a factor, or to stop the subtractor or to reduce the effect of the adaptation in some other way, for example by reducing the amount subtracted or increasing the influence of the past coefficient by averaging with the past coefficient.

The two-dimensional equalizer coefficients at discrete time k are in this example represented by complex 2×2 matrices $\{C_l^{(k)}\}$ with l ranging over the equalizer length. FIG. 5 shows a schematic view of another example of an implementation of the coefficient generator. As in the above referenced known SG algorithm, the coefficient update is modified by an inhibition signal in the form of two flags $f_k=[f_{1,k},f_{2,k}]^T$ Two sets of updated coefficients are generated, one set for the real part, and the other set for the imaginary part, according to equations as follows.

$$\hat{C}_{l,R}^{(k+1)}=\hat{C}_{l,R}^{(k)}-\alpha(f_{k,R}\odot\hat{e}_{k,R}x_{k\ldots l,R}^H+f_{k,I}\odot\hat{e}_{k,I}x_{k\ldots l,I}^H)$$

$$\hat{C}_{l,I}^{(k+1)}=\hat{C}_{l,I}^{(k)}+\alpha(f_{k,R}\odot\hat{e}_{k,R}x_{k\ldots l,I}^H-f_{k,I}\odot\hat{e}_{k,I}x_{k\ldots l,R}^H) \quad (10)$$

where α is the step size and {R,I} denote real and imaginary components.

In FIG. 5, this equation is implemented by a series of logical operations. By having the inhibit signal acting separately on the real and imaginary parts of the coefficients for both polarization channels, it becomes possible to inhibit update of either or both of the components. This in turn means that in some circumstances there can be an update of one of the components, real or imaginary while update of the other is inhibited. This can mean that there is less inhibiting and so better convergence than otherwise.

In FIG. 5 adder 313 combines two terms of the equation for the coefficients for the real part, by adding the outputs of multipliers 316 and 318. Multiplier 316 obtains a product of a real part of the received signals x and a real part of the phase corrected error e. This multiplier is operable dependent on the flag representing a real part of the inhibit signal. Multiplier 318 obtains a product of the imaginary part of the received signals x and the imaginary part of the phase corrected error e. This multiplier is operable dependent on the flag representing an imaginary part of the inhibit signal The output of the adder 313 is subtracted from a preceding coefficient set for the real part by subtractor 321, and fed to the coefficient store 336, for output as an updated coefficient.

Subtractor 314 combines two terms of the equation for the coefficients for the imaginary part by subtracting the output of multiplier 317 from an output of multiplier 319. Multiplier 317 obtains a product of an imaginary part of the received signals x and a real part of the phase corrected error e. This multiplier is operable dependent on the flag representing a real part of the inhibit signal. Multiplier 319 obtains a product of the real part of the received signals x and the imaginary part of the phase corrected error e. This multiplier is operable dependent on the flag representing an imaginary part of the inhibit signal The output of subtractor 314 is added to a preceding coefficient set for the imaginary part by adder 322, and fed to the coefficient store 337, for output as an updated coefficient for the imaginary part.

Figure 6:
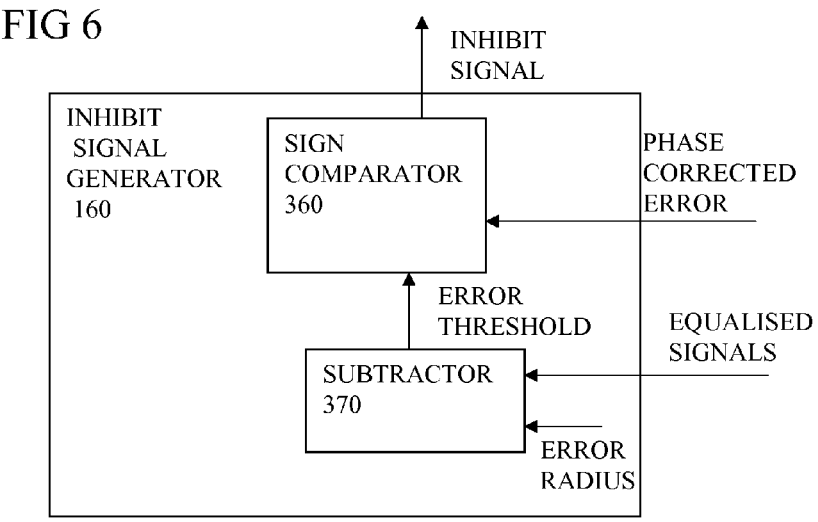
FIG. 6 shows a schematic view of an example of an inhibit signal generator.

FIG. 6, Inhibit Signal Generator

The generation of the inhibit signal in the form of the two flags can be as follows.

The flags $f_{i,k,R,I}$ are set equal to 1 (otherwise to 0) only if $$sgn(\hat{e}_{i,k,\{R,I\}})=sgn(\tilde{e}_{i,k,\{R,I\}}) \quad (11)$$

Where $$\tilde{e}_{i,k,\{R,I\}}=y_{i,k,\{R,I\}}-sgn(y_{i,k,\{R,I\}})\beta_k \quad (12)$$

with the value of $\beta_k$ properly chosen (optionally time-varying) to suit the particular implementation as described in more detail in Picchi et al.

FIG. 6 shows a schematic view of an implementation of the inhibit signal generator according to such equations. A sign comparator 360 is provided to compare signs of an error threshold and the phase corrected error. The error threshold is provided by a subtractor 370 which subtracts the error radius $\beta_k$ from the equalized signals y, with the sign of the error radius $\beta_k$ being adjusted according to the sign of the equalized signals y.

The described embodiments can help enable a simple and effective implementation of equalizer tap coefficient update, particularly in optical coherent high-order modulation formats, including the decoding of quadrature differentially encoded data, with reduced complexity comparing to existing solutions. The combination of the asynchronous detection strategy with the Stop-and-go algorithm can help ensure a fast convergence of the equalizer in presence of high intersymbol interference due to fiber linear impairments and of strong phase noise and frequency offset.

Figure 7:
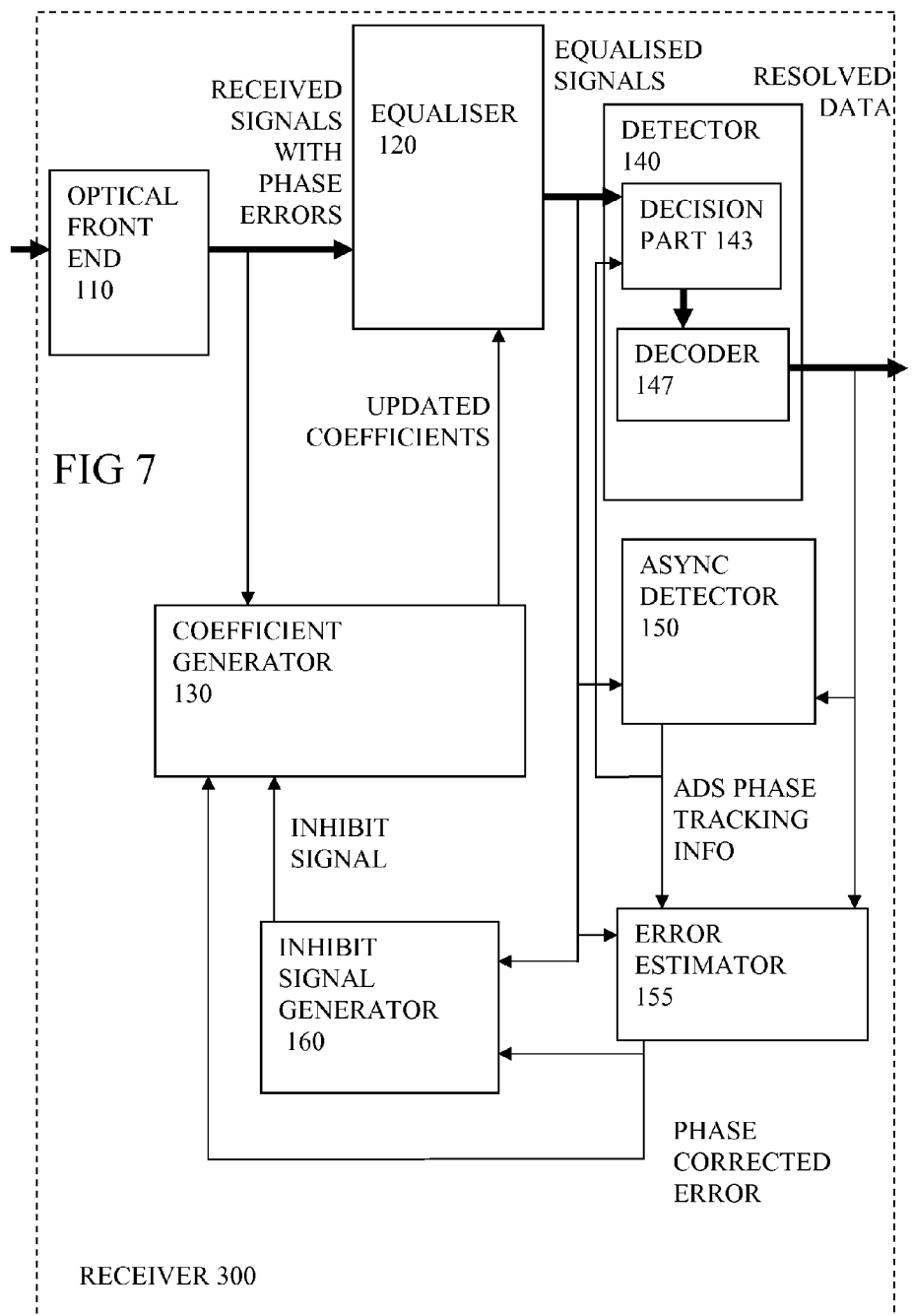
FIG. 7 shows a schematic view of a receiver according to an embodiment with an optical front end and decoder.
Figure 8:
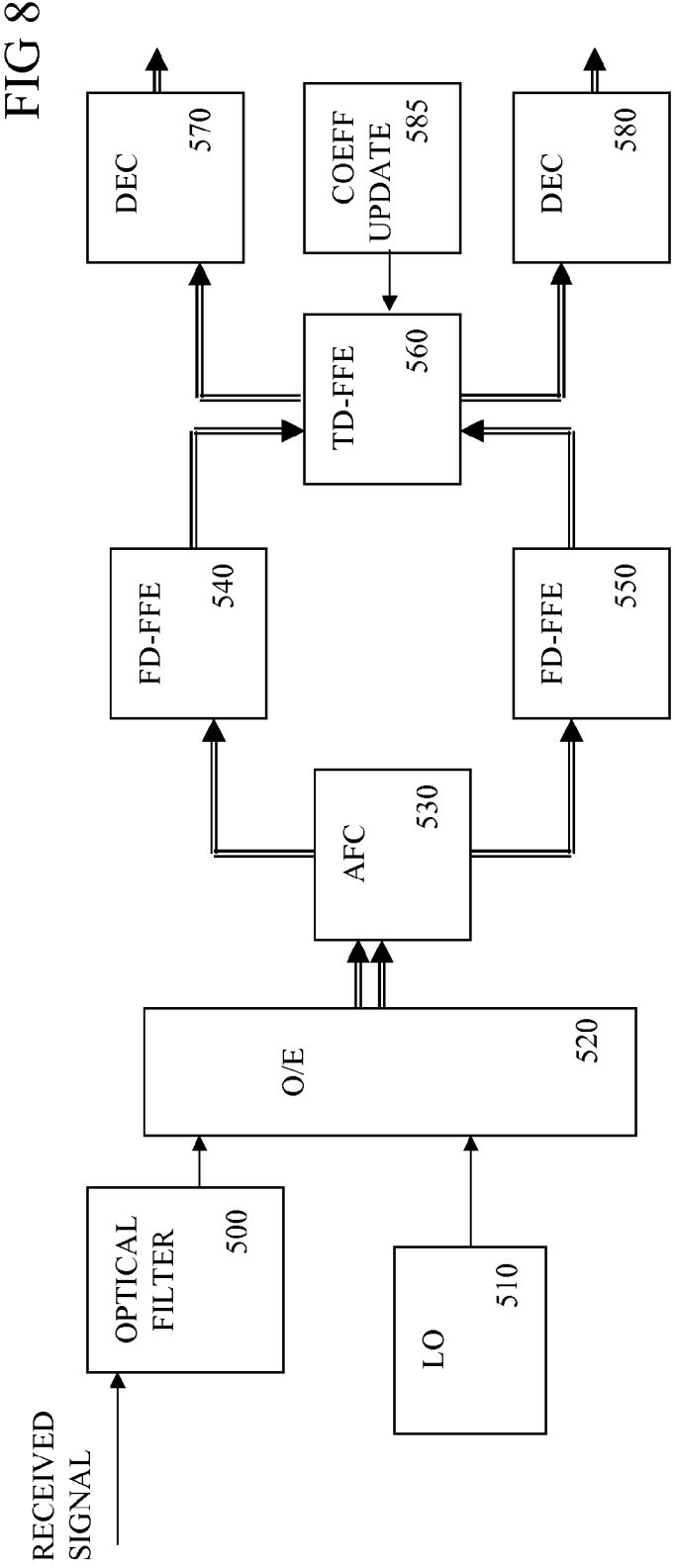
FIG. 8 shows a schematic view of a receiver according to another embodiment.

FIGS. 7, 8 Receiver Embodiments

FIG. 7 shows an alternative embodiment based on the embodiment of FIG. 1 with a number of additional features. The adaptive equalizer is part of an optical receiver, having an optical front end 110, and a detector implemented as follows. A decision part 143 is followed by a decoder 147. In this case, the decoding depends on what kind of encoding takes place at a transmission side. The decoding is within the feedback loop. Optionally the decision part receives signals representing phase and amplitude information with a given resolution, and determines which of a number of points on a grid on the complex plane is closest or most likely. This can be implemented in a number of ways following established practice. The decision can for example involve determining a minimum Euclidian distance.

FIG. 8 shows a system view of an example of an optical receiver. A received signal is fed via an optical filter 500, to a splitter and optical to electrical converter 520. A local oscillator 510 also feeds an optical signal to the converter 520. This converter outputs two signals corresponding to signals transmitted over different optical channels such as different wavelengths or polarizations. An automatic frequency controller AFC 530 adjusts the frequencies to compensate for distortions, and feeds outputs into channels A and B, which each include frequency domain feed forward equalization FD-FEE, 540, 550, followed by Time Domain FEE 560, followed by decision parts 570, 580. The time domain FEE is adaptive, with a coefficient update part 585, which can be implemented in various ways as described above. The frequency domain FEE would typically have a Fourier transform to convert signals into the frequency domain, which makes for easier compensation of some impairments.

Figure 9:
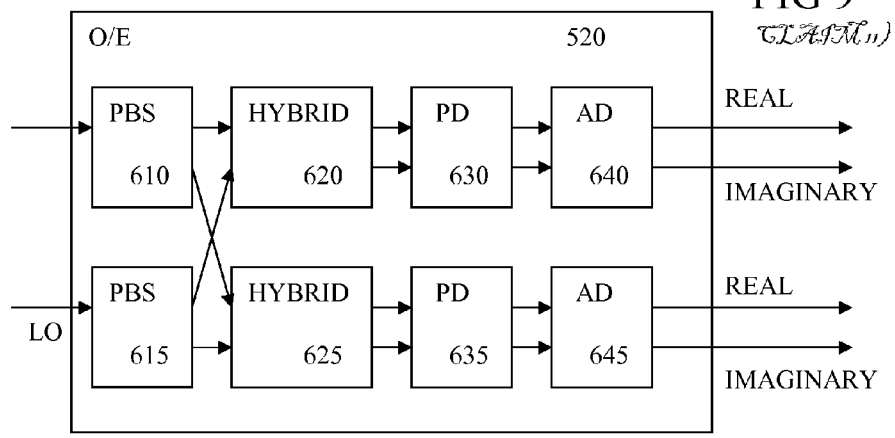
FIG. 9 shows a schematic view of an example of a polarization splitter and optical converter for the embodiment of FIG. 8 or other embodiments.

FIG. 9, Splitter and Converter

FIG. 9 shows a schematic view of an example implementation of the splitter and converter 520. A received optical signal is fed to a first PBS 610, a Local Oscillator optical signal is fed to a second PBS 615. Each PBS outputs two beams of different polarization states. The two beams of one polarization state are fed to a first hybrid 620, and the two beams of the other polarization state are fed to a second hybrid 625. The hybrids each output optical signals corresponding to in phase and quadrature components. A first pair of photodiodes PD 630 converts the real and imaginary signals for a first polarization channel A into electrical signals, which are then converted from analog to digital format by AD device 640. A second pair of photodiodes PD 630 converts the real and imaginary signals for a second polarization channel B into electrical signals, which are then converted from analog to digital format by second AD device 645.

FIG. 10, FFE

The example implementation of the equalizer by an adaptive 2-D Fractionally spaced FFE will now be discussed. Assuming that the AFC block perfectly compensates for the frequency offset, the samples can be expressed as $$x_{k\eta+n} = \sum_l Q_{\eta(k-l)+n} d_l + w_{k\eta+n} \quad (13)$$

$$= \sum_{l=0}^{L_g-1} Q_{l\eta+n} d_{k-l} + w_{k\eta+n}$$

having assumed that $Q_l=Q(lT_c)$ has a length of L samples and $L_g=\lceil L/\eta \rceil$. Samples $w_{k\eta+n}$ after the frequency compensation are statistically equivalent to the samples of the noise after the electrical filters. Hence, the two components $w_{1,k\eta+n}$ and $w_{2,k\eta+n}$ or $W_{k\eta+n}$ are independent and identically distributed complex Gaussian random variables each with mean zero and variance $\sigma^2=N_0\eta/T$, i.e., $$E\{|w_{1,k\eta+n}|^2\}=E\{|w_{2,k\eta+n}|^2\}=\sigma^2=N_0\eta/T \quad (14)$$

If the discrete 2-D signal $x_{k\eta+n}$ is filtered with a 2-D filter with impulse response $C_l, l=-L_c+1, \ldots, -1, 0$. The output of this fractionally spaced FFE is $$y_{k\eta+n} = \sum_{l=-(L_c-1)}^{0} C_l x_{k\eta+n-l} \tag{15}$$

Assuming now that $Q_l$ is known, since from equations (3) and (4)

$$Q_{-l}^H \otimes Q_{l\,l=k\eta} = \delta_k I \tag{16}$$

it is sufficient to choose $L_c=L$ and $C_l=Q_{-l}^H$, such that the FFE output at symbol time will be $$y_{k\eta} = d_k + w_{k\eta}^I \tag{17}$$

where $w_{k\eta}^I$ is statistically equivalent to $w_{k\eta}$ since the FFE channel impulse response satisfy equation (16) and hence it does not color the noise. This is obvious, since PMD and GVD are phase distortions only. Hence, on each symbol stream, a symbol-by-symbol detector based on the strategy $$\hat{d}_{i,k} = \underset{d_{i,k}}{\text{argmin}} \, [|y_{i,k\eta} - d_{i,k}|^2] \tag{18}$$

and followed by differential decoding is sufficient to obtain a decision on the transmitted symbols. This is not surprising, since it is implementing a 2-D matched filter and the discrete-time channel impulse response $Q_l$ satisfy the condition for the absence of ISI. It can also be stated that by filtering each of the two components of $x_{k\eta+n}$ with a filter matched to p(t), in the b2b case we would obtain an output statistically equivalent to $y_{k\eta}$. Notice that this FFE also performs the compensation for a constant phase shift, possibly introduced by transmit and receive lasers, which is implicit in the knowledge of the channel impulse response. Hence, an explicit phase estimation, is not necessary, at least when phase noise is absent (i.e., assuming that the transmit and receive lasers only introduce a constant phase shift). The FFE structure is shown in FIG. 10 where $[C_l]_{k,n}$ denotes the (k,n) entry of $C_l$.

Figure 10:
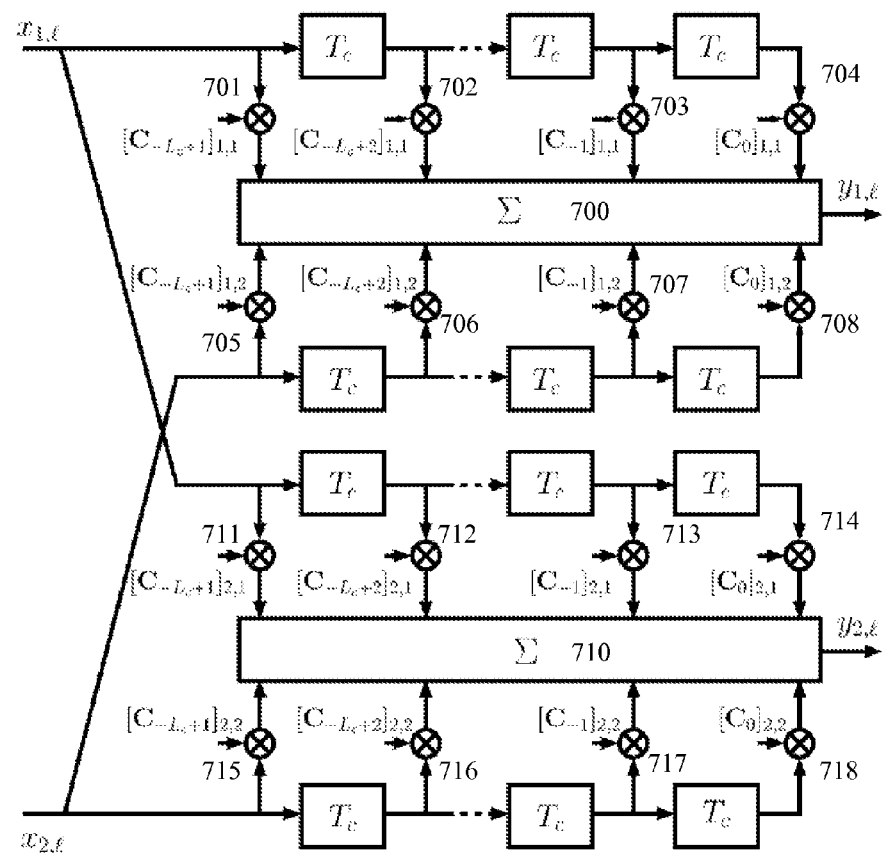
FIG. 10 shows a schematic view of an example of a an equalizer equalizing two channels, for embodiments of the invention.

FIG. 10 shows a schematic view of an example implementation of the equalizer 120, for use in an embodiment of a receiver for use in receiving two channels, 1 and 2 (or A and B). A first stream of complex values x1 received from polarization channel 1, is fed to a series of delay elements Tc. A second stream x2 is provided to another series of delay elements Tc. For each time step, four multipliers are provided for generating products of parts of the received signal with corresponding particular parts of the coefficients. The coefficients for each time step include four complex values. $C_{1,1}$ and $C_{1,2}$, are used for generating equalized signals y1 for the first of the channels. $C_{2,1}$ and $C_{2,2}$, are used for generating equalized signals y2 for the second of the channels. Multiplier 701 is used to generate a product of $C_{1,1}$ and x1. Multiplier 705 is used to generate a product of $C_{1,2}$ and x2. These products are summed by adder 700, together with similar products for other time steps, provided by multipliers 702, 703,704, 706, 707 and 708, to provide equalized signal y1.

To provide equalized signal y2, multiplier 711 is used to generate a product of $C_{2,1}$ and x1. Multiplier 715 is used to generate a product of $C_{2,2}$ and x2. These products are summed by adder 710, together with similar products for other time steps, provided by multipliers 712, 713, 714, 716, 717 and 718, to provide equalized signal y2.

Figure 11:
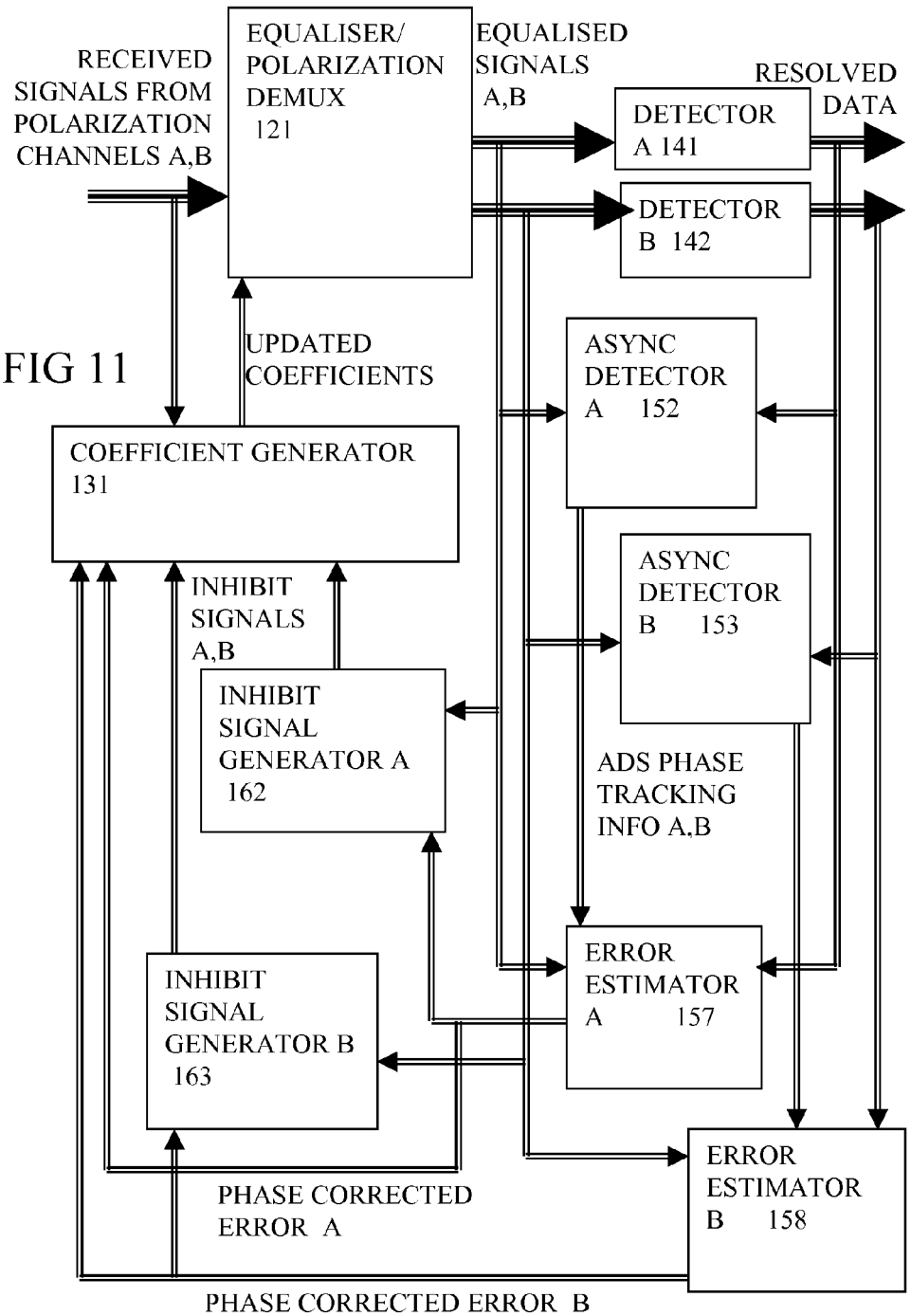
FIG. 11 shows a schematic view of an example adaptive equalizer for equalizing two channels according to an embodiment.

FIG. 11, Adaptive Equalizer for Two Channels

FIG. 11 shows a schematic view of an adaptive equalizer similar to that of FIG. 1, showing how some parts are duplicated and other parts are modified for use with two channels A and B. The detector is divided into detector A 141 for channel A and detector B for channel B. This division is also carried out for other parts, so there is a asynchronous detector A 152 and asynchronous detector B 153. These parts respectively feed error estimator A 157, and error estimator B 158. These parts respectively feed inhibit signal generator A 162, and inhibit signal generator B 163. Coefficient generator 131 is not split into separate channels so that the coefficients for one channel are influenced by errors and received signals for both channels. Also, the equalizer is not divided so that as shown in FIG. 10 for example, the equalization for one channel is influenced by the coefficients and received signals for the other channel.

Figure 12:
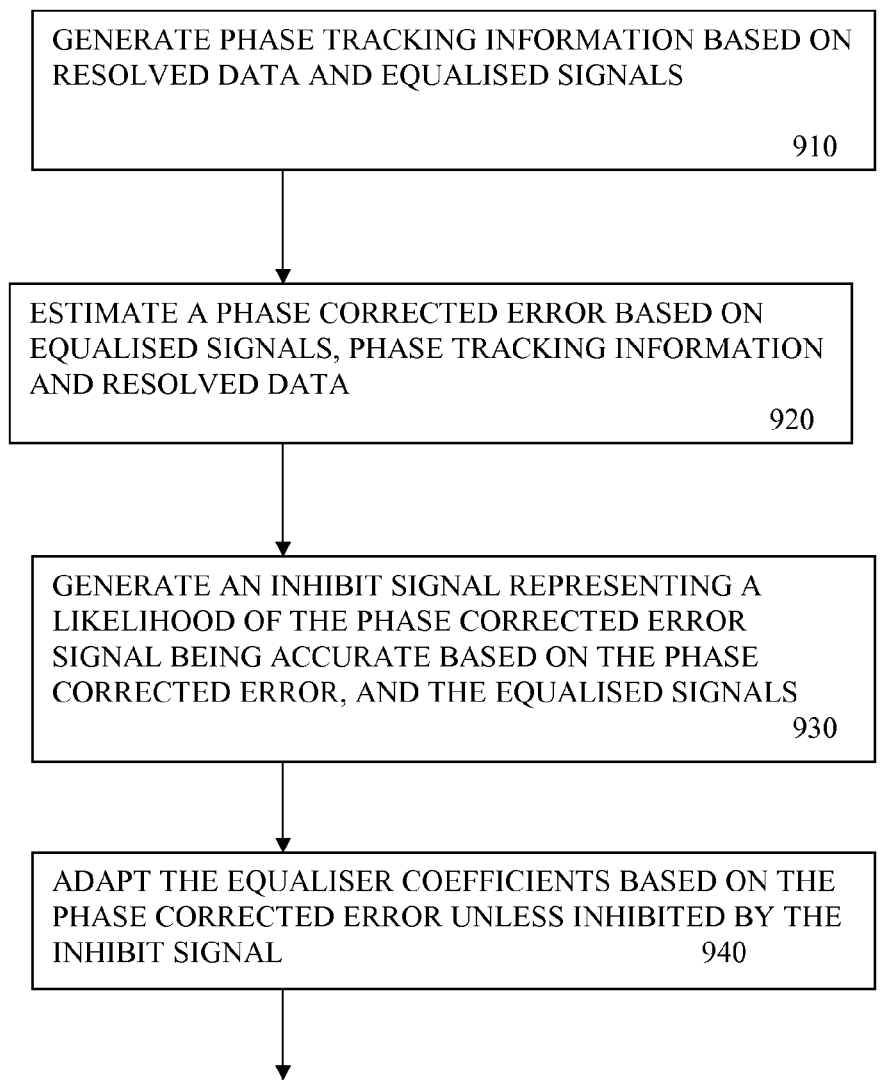
FIG. 12 shows steps of a method of adapting coefficients according to an embodiment.

FIG. 12, Method of Adapting Coefficients

FIG. 12 shows a view of method steps for adapting the coefficients according to an embodiment. At step 910, phase tracking information is generated based on the resolved data and equalized signals. At step 920, a phase corrected error is estimated based on the equalized signals, phase tracking information and resolved data. At step 930 an inhibit signal is generated representing a likelihood of the phase corrected error signal being accurate, based on the phase corrected error and the equalized signals. The equalizer coefficients are then adapted at step 940 based on the phase corrected error signal unless inhibited by the inhibit signal. These steps can be carried out as part of an operation to receive signals over one or more channels for example.

Figure 13:
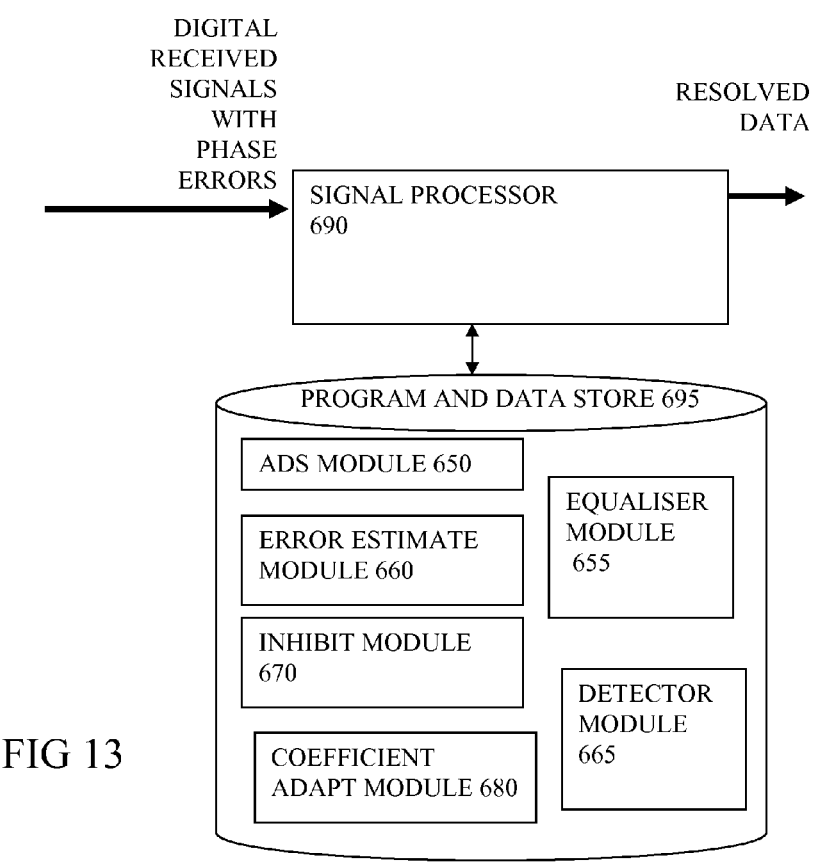
FIG. 13 shows a schematic view of another example adaptive equalizer according to an embodiment, using a signal processor and software modules.

FIG. 13, Signal Processor Implementation

FIG. 13 shows a schematic view of another embodiment of an adaptive equalizer. In this version, the various functions and connections shown in FIG. 1 are implemented by a signal processor 690, having an on board or external store 695 for programs and data. Each of the functions shown in FIG. 1 can be implemented in the form of software modules. An ADS module 650 generates phase tracking information. An error estimate module 660 is provided coupled to an inhibit module 670. A coefficient adapt module 680 generates the adapted coefficients for use by an equalizer module 655. This part feeds a detector module 665. The modules can all be arranged to operate as described above with reference to FIGS. 1 to 12.

Asynchronous Detection Strategy

As is explained in Colavolpe et al, the receiver robustness against phase noise, which is one of the main issues in coherent optical systems, can be further increased by means of a symbol-by-symbol asynchronous detection strategy. In particular, an asynchronous strategy can be employed which gives no performance degradation w.r.t. a synchronous detection strategy when the phase noise is absent. According to them, symbols $d_{i,k}$, i=1, 2, are detected as $$\hat{d}_{i,k} = \underset{d_{i,k}}{\text{argmax}} \left[ |y_{i,k\eta} d_{i,k}^* + g_{i,k}| - \frac{|d_{i,k}|^2}{2} \right] \tag{19}$$

where $$g_{i,k} = \sum_{n=1}^{N} y_{i,(k-n)\eta} \hat{d}_{i,k-n}^* \tag{20}$$

or in an alternative case if recursively computed as $$g_{i,k} = \beta g_{i,k-1} + y_{i,(k-1)\eta} \hat{d}_{i,k-1}^* \tag{21}$$

The integer parameter N in equation (20) and the real parameter (radius error) $0\leq\beta\leq1$ in equation (21) are design parameters that can be optimized for the phase noise at hand. The receiver robustness can be further increased by using linear prediction and still working in a symbol-by-symbol fashion. The prediction coefficients are, in this case, a priori computed based on the knowledge of the phase noise at hand. Other alternatives can be envisaged.

When an asynchronous detection strategy is adopted, it is more convenient to use a filter adjustment rule as follows (ignoring for the moment the inhibit signal described above)

$$\hat{C}_l^{(k+1)} = \hat{C}_l^{(k)} - \alpha(y_{k_n} - Ag_k \odot \hat{d}_k)x_{k_n-l}^H \quad (22)$$

Where $g_k = (g_{1,k}, g_{2,k})^T$ and $\odot$ denotes the Hadamard product (entrywise product or Schur product). This update rule is an extension of the known update rule to the case of two polarizations and converges to the same minimum of the rule, although it is more robust in the presence of phase noise. The adoption of the asynchronous detection strategy and the asynchronous filter adjustment has also a convenient side effect. In fact, in this case, the FFE must track the variations due to channel only without taking into account those due to phase noise. This allows for a more relaxed adjustment of the FFE taps.

As also explained in Colavolpe et al, the described symbol-by-symbol asynchronous detection strategies and the updating rule can be equivalently expressed as a function of the information symbols. Other variations and embodiments can be envisaged within the claims.

The invention claimed is:

1. An adaptive equaliser for equalising received signals, the adaptive equaliser comprising:
    an equaliser coupled to equalise the received signals according to equalisation coefficients, to provide equalised signals having a representation of amplitudes and phases of the received signals;
    a detector for resolving data from the equalised signals;
    an asynchronous detection part for generating phase tracking information based on the resolved data and the equalised signals;
    an error estimator for estimating a phase corrected error based on the equalised signals, the phase tracking information, and the resolved data;
    an inhibit signal generator for generating an inhibit signal to inhibit updating of the equalisation coefficients, the inhibit signal representing a likelihood of the phase corrected error being accurate, determined according to the phase corrected error, and according to the equalised signals; and
    a coefficient generator for adapting the equalisation coefficients for the equaliser based on the received signals, and based on the phase corrected error, arranged to inhibit the adapting according to the inhibit signal.

2. The adaptive equaliser of claim 1, the asynchronous detection part having a multiplier for generating a product of the resolved data and the equalised signals, and an adder for determining a weighted combination of products taken at past time instants.

3. The adaptive equaliser of claim 1, the detector being arranged to resolve the data using the phase tracking information generated by a non coherent detection part.

4. The adaptive equaliser of claim 1, the detector comprising a decoder for differentially decoding detected data, the resolved data comprising the decoded data.

5. The adaptive equaliser of claim 1, the coefficient generator having a multiplier to determine a product of the phase corrected error and the received signals, and being arranged to determine iteratively a next set of coefficients according to a difference between the product and a previous set of coefficients.

6. The adaptive equaliser of claim 1, the coefficient generator being arranged to generate updated coefficients for equalisation of real and imaginary components, the inhibit signal having separate components for the real component coefficients and the imaginary component coefficients, and the coefficient generator being arranged to inhibit update of at least one of the real component coefficients and imaginary component coefficients according to the separate components of the inhibit signal.

7. The adaptive equaliser of claim 1, the error estimator having a multiplier to determine a product of the phase tracking information and the data, and a subtractor to determine a difference between the equalised signals and the product, and wherein the phase corrected error is based on the difference.

8. The adaptive equaliser of claim 1, the inhibit signal generator having a subtractor to determine an error threshold by determining a distance between an equalised signal and a predetermined radius error, the predetermined radius error having the same sign as that of the equalised signal, and the inhibit signal generator also having a comparator to determine if the error threshold has the same sign as a sign of the phase corrected error, and to generate the inhibit signal according to an output of the comparator.

9. The adaptive equaliser of claim 1, the equaliser being a feed forward equaliser for outputting complex values by determining products of successive complex values of the received signals and complex-valued coefficients, and summing the products to output the equalised signals.

10. A receiver having an optical front end for receiving an optical signal and outputting a received signal in electrical form, the receiver also having an adaptive equaliser for equalising the received signal, the adaptive equaliser comprising:
    an equaliser coupled to equalise the received signals according to equalisation coefficients, to provide equalised signals having a representation of amplitudes and phases of the received signals;
    a detector for resolving data from the equalised signals;
    an asynchronous detection part for generating phase tracking information based on the resolved data and the equalised signals;
    an error estimator for estimating a phase corrected error based on the equalised signals, the phase tracking information, and the resolved data;
    an inhibit signal generator for generating an inhibit signal to inhibit updating of the equalisation coefficients, the inhibit signal representing a likelihood of the phase corrected error being accurate, determined according to the phase corrected error, and according to the equalised signals; and
    a coefficient generator for adapting the equalisation coefficients for the equaliser based on the received signals, based on the phase corrected error, and arranged to inhibit the adapting according to the inhibit signal.

11. The receiver of claim 10, the optical front end having a polarization splitter for separating optical signals transmitted with different optical polarizations, and converters for converting the separated optical signals into separate electrical signals having real and imaginary components, wherein the equaliser is arranged to provide equalised real and imaginary components of each of the separated electrical signals.

12. A method of generating updated coefficients for an adaptive equaliser, the adaptive equaliser having an equaliser for outputting equalised signals and a detector for resolving data from the equalised signals, the method comprising:

generating phase tracking information using asynchronous detection based on the resolved data, and the equalised signals;

estimating a phase corrected error based on the equalised signals, the phase tracking information, and the resolved data;

generating an inhibit signal to inhibit updating of the equalisation coefficients, the inhibit signal representing a likelihood of the phase corrected error being accurate, determined according to the phase corrected error, and according to the equalised signals;

adapting the equalisation coefficients for the equaliser based on the received signals, and based on the phase corrected error; and inhibiting the adapting according to the inhibit signal.

13. The method of claim 12, further comprising the steps of generating a product of the resolved data and the equalised signals, and determining a weighted combination of products taken at past time instants.

14. The method of claim 12 further comprising the step of resolving the data using the phase tracking information generated by an asynchronous detection part.

15. A non-transitory computer-readable storage medium having instructions stored therein, which when executed by a processor, cause the processor generating updated coefficients for an adaptive equaliser, the adaptive equaliser having an equaliser for outputting equalised signals and a detector for resolving data from the equalised signals, the method comprising:

generating phase tracking information using asynchronous detection based on the resolved data, and the equalised signals;

estimating a phase corrected error based on the equalised signals, the phase tracking information, and the resolved data;

generating an inhibit signal to inhibit updating of the equalisation coefficients, the inhibit signal representing a likelihood of the phase corrected error being accurate, determined according to the phase corrected error, and according to the equalised signals;

adapting the equalisation coefficients for the equaliser based on the received signals, and based on the phase corrected error; and inhibiting the adapting according to the inhibit signal.

16. The non-transitory computer-readable storage medium of claim 15, wherein the method further comprising the steps of generating a product of the resolved data and the equalised signals, and determining a weighted combination of products taken at past time instants.

17. The non-transitory computer-readable storage medium of claim 15, wherein the method further comprising the step of resolving the data using the phase tracking information generated by an asynchronous detection part.

\* \* \* \* \*